US007523173B2

(12) United States Patent
Seki et al.

(10) Patent No.: US 7,523,173 B2
(45) Date of Patent: Apr. 21, 2009

(54) SYSTEM AND METHOD FOR WEB PAGE ACQUISITION

(75) Inventors: Naishin Seki, Yokohama (JP); Yuhichi Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 09/821,400

(22) Filed: Mar. 29, 2001

(65) Prior Publication Data

US 2001/0052003 A1 Dec. 13, 2001

(30) Foreign Application Priority Data

Mar. 29, 2000 (JP) ............................. 2000-091874

(51) Int. Cl.
*G06F 15/16* (2006.01)
(52) U.S. Cl. ...................... 709/219; 709/217; 709/223; 709/235
(58) Field of Classification Search ................. 709/219, 709/200, 203, 217, 218, 229, 224, 235, 227, 709/216, 223, 226
See application file for complete search history.

(56) References Cited

U.S. PATENT DOCUMENTS

| 5,727,164 | A | * | 3/1998 | Kaye et al. ..................... 705/28 |
| 5,768,528 | A | * | 6/1998 | Stumm ........................ 709/217 |
| 5,896,506 | A | * | 4/1999 | Ali et al. ...................... 709/216 |
| 5,956,488 | A | * | 9/1999 | Suzuki ........................ 709/219 |
| 5,961,602 | A | * | 10/1999 | Thompson et al. ........... 709/229 |
| 5,978,807 | A | * | 11/1999 | Mano et al. ..................... 707/10 |
| 6,134,584 | A | * | 10/2000 | Chang et al. ................. 709/219 |
| 6,154,769 | A | * | 11/2000 | Cherkasova et al. ......... 709/228 |
| 6,182,122 | B1 | * | 1/2001 | Berstis ........................ 709/217 |
| 6,282,709 | B1 | * | 8/2001 | Reha et al. ................... 717/175 |
| 6,594,682 | B2 | * | 7/2003 | Peterson et al. ............. 709/219 |
| 6,606,646 | B2 | * | 8/2003 | Feigenbaum ................ 709/203 |
| 6,742,033 | B1 | * | 5/2004 | Smith et al. .................. 709/224 |
| 6,745,237 | B1 | * | 6/2004 | Garrity et al. ............... 709/219 |
| 6,769,019 | B2 | * | 7/2004 | Ferguson ..................... 709/219 |
| 6,772,193 | B1 | * | 8/2004 | Igawa et al. .................. 709/219 |
| 6,785,675 | B1 | * | 8/2004 | Graves et al. ................... 704/4 |
| 6,959,327 | B1 | * | 10/2005 | Vogl et al. ................... 709/219 |
| 6,993,559 | B2 | * | 1/2006 | Jilk et al. ..................... 709/219 |
| 2001/0052003 | A1 | * | 12/2001 | Seki et al. ................... 709/219 |
| 2004/0024891 | A1 | * | 2/2004 | Agrusa et al. ............... 709/230 |

OTHER PUBLICATIONS

Haskin, David "Traveling Software's Web Ex 20 Brings The Internet to you", Computer Shopper Sep. 1997, v. 16, No. 9, p. 527(1).*

* cited by examiner

*Primary Examiner*—Ramy M Osman
(74) *Attorney, Agent, or Firm*—Ference & Associates LLC

(57) ABSTRACT

A web page acquisition system, provider, method, computer readable memory and program of instructions for web page acquisition that reduces the waiting time that is experienced by a user who accesses a network site when the network is busy and also reduces the load that is imposed on the server of a provider.

13 Claims, 12 Drawing Sheets

User profile format

| | |
|---|---|
| E-mail address | abcdef@japan.aaa.com |
| Maximum transmission size | 200KB |
| Division and transmission | Yes |
| URL | www.aaa.co.jp |
| | www.bbb.co.jp/news |
| Acquisition frequency | www.aaa.co.jp    Monday, Wednesday, Friday |
| | www.bbb.co.jp/news    Every day |
| Depth | www.aaa.co.jp    First level |
| | www.bbb.co.jp/news    Second level |

Fig. 4

Web page acquisition request format

| | |
|---|---|
| URL list | www.aaa.com/ |
| | www.bbb.co.jp/news/0001/11/ |
| Downloading time | 10:00PM |
| Depth | www.aaa.com/    First level |
| | www.bbb.co.jp/news/0001/11/    Second level |
| Time limited acquisition period | 3/5-3/7 |

Fig. 5

Operation of web page acquisition server

| | |
|---|---|
| Domain name | siteID12 => www.aaa.co.jp |
| Image name | /gif/gif03.gif => www.aaa.co.jp/gif/aaa.gif |
| | /gif/gif04.gif => www.aaa.co.jp/gif/i_shopaaa.gif |
| | /gif/gif05.gif => www.aaa.co.jp/gif/i_suport.gif |

| URL | User ID |
|---|---|
| www.aaa.co.jp | 02 |
| www.aaa.co.jp/* | 02 |
| www.ccc.com | 02 |
| www.ccc.com/* | 02 |

Fig. 13

SYSTEM AND METHOD FOR WEB PAGE ACQUISITION

CLAIM FOR PRIORITY

This application claims priority from Japanese Application No. 2000-091874, filed on Mar. 29, 2000, and which is hereby incorporated by reference as if fully set forth herein.

FIELD OF THE INVENTION

The present invention relates to a web page acquisition service for supporting operations of obtaining web pages from web servers through connections to the Internet, and browsing the thus obtained web pages.

BACKGROUND OF THE INVENTION

The number of users who at any time access the currently popular Internet tends to correspond to a time axis reflecting the life patterns of the users. That is, since many people who use the Internet work in the daytime, for their personal convenience, they tend to log on in large numbers at night, and as a result, communication traffic is greatly increased and the network facilities become congested.

When the volume of the traffic carried by a communication network is increased, accordingly, the time required for data transfer is extended. Thus, at night, when the Internet is crowded, after sending a connection request to a desired Internet site, a user must wait for an extended period of time before he or she is able to complete the downloading of the web page source for the site. An indication that, which indicate that the work efficiency has been deteriorated.

Furthermore, since the general run of users employs dial-up, telephone line connections to access the Internet, if the time required for such a user to complete a data transfer is extended, the charges the user incurs for the line connection time will increase rapidly, which is definitely not economically preferable.

Internet service providers are also affected when the large majority of accesses take place during a specific time period. The load imposed in such a case is excessive, and may deteriorate the ability of a provider to service clients properly.

The autopilot program that is now available makes it possible for a user to avoid having to access the congested Internet. A user installs the autopilot program on his or her client machine, and sets it so that at a designated time it automatically accesses a provider and obtains an Internet connection. Thereafter, the program automatically transmits a connection request to a previously registered site, and downloads a desired web page source. When the autopilot program is set for activation in a time period during which traffic is not heavy, the time spent waiting to obtain a web page source can be reduced.

Also, providers normally have availability on their servers cache functions for the temporary storage of web page sources for sites that users have accessed. Therefore, for the web page of a site that a user frequently accesses, so long as the data for the site is available in the cache memory of the server, the web page source held by the server can be transmitted directly to the client machine of the user when the user issues another connection request. In this manner, since the intercommunication between the provider and the web site is not performed, the time the user is forced to wait can be shortened even more.

As is described above, since the communication traffic volume is increased when many users access the Internet simultaneously, the time a user spends waiting is extended and work efficiency is thereby deteriorated, and since when waiting time is extended the line connection charges accrued by the user are increased, this is an economically unacceptable condition.

Further, for a provider, the load imposed on a server is increased when there is a high concentration of accesses. And when a user employs the autopilot program in order to avoid accessing the Internet when traffic is heavy, although for the user this means effectively suppresses the waiting time extension and the line connection charge increase, for a provider little or no actual relief is afforded, since the load imposed on the server of the provider will not be reduced unless a considerable number of users begin to access the Internet at widely distributed times.

Furthermore, although, as is described above, the server of a provider may have a cache function, when the cache memory has been filled, data stored in the cache memory are mechanically deleted, beginning with the oldest data. Therefore, when a user accesses the cache memory, the data the user desires will not always be available therein which makes user's waiting time longer than expected.

There thus continues to be a need to further shorten the time a user must wait when accessing a web page on a network during a busy time period, and to reduce the load imposed on the server of a provider.

SUMMARY OF THE INVENTION

The present invention broadly contemplates a system and method for web page acquisition which reduces the waiting time experienced by a user who accesses a network site when the network is busy and reduces the load imposed on the server of a provider.

In accordance with one aspect of the present invention, a web page acquisition service system comprises a web page acquisition server and a user terminal, both of which are connected to a communication network, wherein the user terminal transmits to the web page acquisition server a web page acquisition request that includes various acquisition conditions; and wherein, in accordance with the acquisition conditions included in the web page acquisition request received from the user terminal, the web page acquisition server acquires a web page source from a web server on the communication network and transmits the web page source to the user terminal.

As one of the acquisition conditions included in the web page acquisition request, the user terminal designates a time condition for the acquisition of a web page source. In accordance with the time condition designated in the web page acquisition request, the web page acquisition server acquires the web page source and transmits the web page source to the user terminal. As the time condition, a time can be set whereat the user terminal issues a web page transmission request to the web page acquisition server. This arrangement is preferable because it ensures that a user can obtain a desired web page at a desired time.

The web page acquisition server preferably performs scheduling for the acquisition of a web page source, while taking into account the time condition that is designated in the web page acquisition request and the volume of the communication traffic carried by the communication network. This arrangement is preferable because, since the web page can be acquired at a time whereat communication traffic is not heavy, the load imposed on the web page acquisition server can be reduced.

As one of the acquisition conditions included in the web page acquisition request, the user terminal designates a time limited period for the acquisition of a web page source. During the designated time limited period contained in the web page acquisition request, the web page acquisition server acquires and transmits, to the user terminal, the web page source. This arrangement is superior because the web page source can be acquired within a desired time period for which both the starting and the ending times can be designated.

When the web page acquisition server receives from a plurality of user terminals a plurality of web page acquisition requests for the same page, the web page acquisition server obtains and archives a corresponding web page source for the plurality of requests, and transmits the web page source to the user terminals that issued the web page acquisition requests. This arrangement is preferable because, since the overlapping web page acquisition requests can be collectively processed, the load imposed on the web page acquisition server can be reduced.

According to another aspect of the present invention, a provider, for providing a service for the acquisition of an Internet connection, comprises: a request acceptance unit for accepting from a user a web page acquisition request that includes a web page acquisition condition; a web page acquisition/archiving unit for obtaining a web page source from a web server and for archiving the web page source in accordance with the web page acquisition condition included in the web page acquisition request; and a transmission control unit for, in accordance with the web page acquisition condition, transmitting the web page source to the user who issued the web page acquisition request.

The transmission control unit forms into a library file the web page source that, in accordance with the web page acquisition request, is obtained and held in the web page acquisition/archiving unit, and transmits the library file to the user terminal. This arrangement is preferable because a user can handle those required web page sources as a single local file.

When a limitation is placed on the size of a data file that the user terminal, which is a web page source transmission destination, can receive as a single transmission, the transmission control unit divides, into segments having an appropriate size for the user terminal, the web page source that is held in the web page acquisition/archiving unit, and forms the segments into library files. This arrangement is preferable because even when the data file a user terminal can receive as a single transmission is small, the web page acquisition service can be provided for the user.

The transmission control unit changes a link for the web page source held by the web page acquisition/archiving unit from an absolute link, based on the URL of a web page source, into a relative link. With this arrangement, the user terminal is enabled to handle a web page as a local file.

According to another aspect of the present invention, a web page acquisition method, which is employed by a web page acquisition server provided on a communication network, is provided and comprises the steps of: accepting, from a user, a web page acquisition request that includes a web page acquisition condition; employing the web page acquisition condition to prepare a schedule for the acquisition of a web page source; acquiring, across the communication network in accordance with the schedule, the web page source from the web server, and archiving the web page source; and transmitting the web page source to the user in accordance with the web page acquisition condition included in the web page acquisition request.

The step of preparing the schedule includes a step of: determining in accordance with a time condition that is included in the web page acquisition request, and while taking into account the volume of the communication traffic across the communication network, the time at which to acquire the web page source designated in the web page acquisition request, and to thereby reduce the load imposed on the web page acquisition server. This arrangement is preferable because, since a web page can be obtained while avoiding time periods during which heavy communication traffic may be encountered, acquisition of the web page can be performed efficiently.

The step of preparing the schedule includes a step of: comparing time conditions included in a plurality of web page acquisition requests, submitted by multiple users, when, at the step of receiving the plurality of the web page acquisition requests, it is determined that all of the web page acquisition requests were submitted for the acquisition of the same web page source, and of preparing a schedule so that the minimum number of repetitions is required for the acquisition, from a web server, of the web page source. This arrangement is preferable because, since the overlapping web page acquisition requests can be collectively processed, acquisition of a web page can be performed efficiently.

According to another aspect of the present invention, a web page acquisition method, employed by an information terminal device connected to the Internet, is provided and which comprises the steps of: transmitting, to a provider, a web page acquisition request in which web page acquisition conditions are designated; issuing a web page transmission request to the provider based on a time condition that is included in the web page acquisition conditions; and receiving a web page source that, in accordance with the web page transmission request, is transmitted by the provider and that was acquired under conditions corresponding to those included in the web page acquisition conditions.

The step for issuing the web page transmission request includes a step of: issuing, upon the receipt of a notification indicating that a web page has been acquired by the provider, the web page transmission request to the provider, regardless of the time condition that is included in the web page acquisition conditions. This arrangement is preferable because after a desired web page is obtained from a provider, an arbitrary timing can be used for the browsing of the web page.

At the step of receiving the web page source, the web page source can be received in the form of a library file.

According to another aspect of the present invention, a storage medium is provided on which computer input means can store a computer-readable program that permits the computer to perform: a process for accepting, from a user, a web page acquisition request that includes a web page acquisition condition; a process for employing the web page acquisition request to prepare a schedule for the acquisition of a web page source; a process for acquiring, across the communication network in accordance with the schedule, the web page source from the web server, and archiving the web page source; and a process for transmitting the web page source to the user in accordance with the web page acquisition condition included in the web page acquisition request. This arrangement is preferable because all the computers that have installed this program can provide a web page acquisition service.

According to another aspect of the present invention, a program transmission apparatus is provided, which comprises: storage means for storing a computer-readable program that permits a computer to perform a process for accepting, from a user, a web page acquisition request that includes a web page acquisition condition, a process for employing the web page acquisition request to prepare a schedule for the acquisition of a web page source, a process for acquiring, across the communication network in accordance with the schedule, the web page source from the web server, and archiving the web page source, and a process for transmitting the web page source to the user in accordance with the web page acquisition condition included in the web page acquisition request; and transmission means for reading the program from the storage means and for transmitting the program. This arrangement is preferable because all the computers that have downloaded this program can provide a web page acquisition service.

According to another aspect of the present invention, a program storage device readable by machine, tangibly embodying a program of instructions executable by the machine to perform a method for web page acquisition is provided, said method comprising the steps of: accepting, from a user, a web page acquisition request that includes a web page acquisition condition; employing said web page acquisition condition to prepare a schedule for the acquisition of a web page source; acquiring, across said communication network in accordance with said schedule, said web page source from said web server, and archiving said web page source; and transmitting said web page source to said user in accordance with said web page acquisition condition included in said web page acquisition request.

According to yet another aspect of the present invention, a program storage device readable by machine, tangibly embodying a program of instructions executable by the machine to perform a method for web page acquisition is provided, said method comprising the steps of: transmitting, to a provider, a web page acquisition request in which web page acquisition conditions are designated; issuing a web page transmission request to said provider based on a time condition that is included in said web page acquisition conditions; and receiving a web page source that, in accordance with said web page transmission request, is transmitted by said provider and that was acquired under conditions corresponding to those included in said web page acquisition conditions.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

FIG. 4 is a diagram showing an example format for a user profile that a user transmits via a user terminal.

FIG. 5 is a diagram showing an example format for a web page acquisition request that a user transmits via a user terminal.

FIG. 12 is a diagram showing an example table that is prepared for the tree structure in FIG. 11.

FIG. 13 is a diagram showing the state of the table in FIG. 8 when all the web page sources requested by a user 01 have been downloaded.

DETAILED DESCRIPTION OF THE PREFERRED EMBODIMENT

The present invention will now be described during the course of an explanation of the preferred embodiment given while referring to the accompanying drawings.

Figure 1:
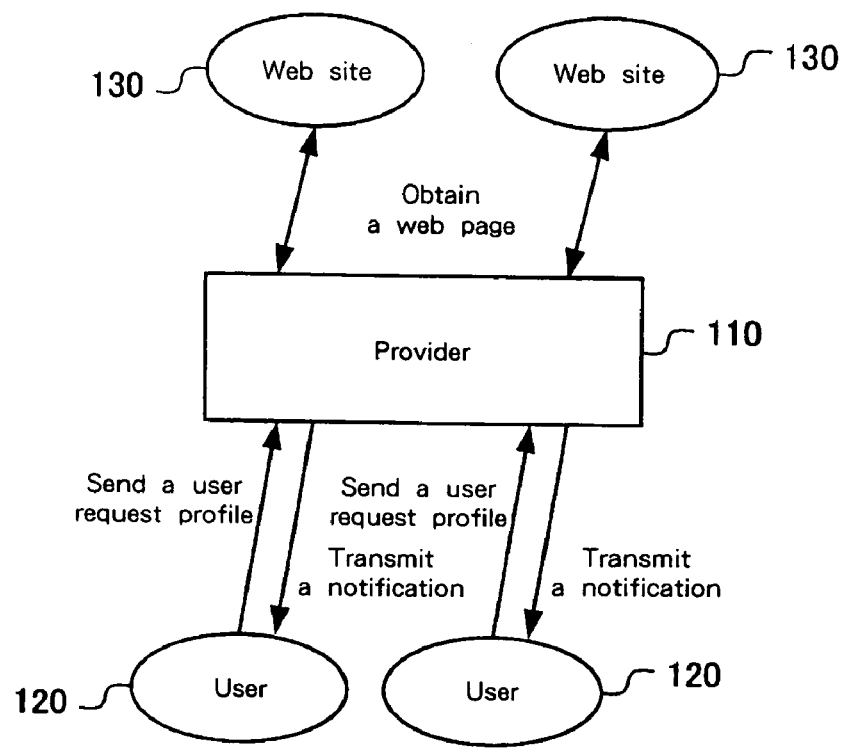
FIG. 1 is a diagram for explaining the concept of a web page acquisition service according to one embodiment of the present invention.

FIG. 1 is a diagram for explaining the concept of a web page acquisition service according to the present invention. And FIG. 2 is a diagram showing the general arrangement of a system that, in accordance with the embodiment, provides a web page acquisition service.

In FIG. 1, the web page acquisition service of this embodiment is furnished by a provider 110 that is located between a user 120 and a web site 130. While as shown in FIG. 2, the system employed for this embodiment comprises a web page acquisition server 210, a user terminal 220 and a web server 230, all of which are connected to the Internet 200.

Figure 2:
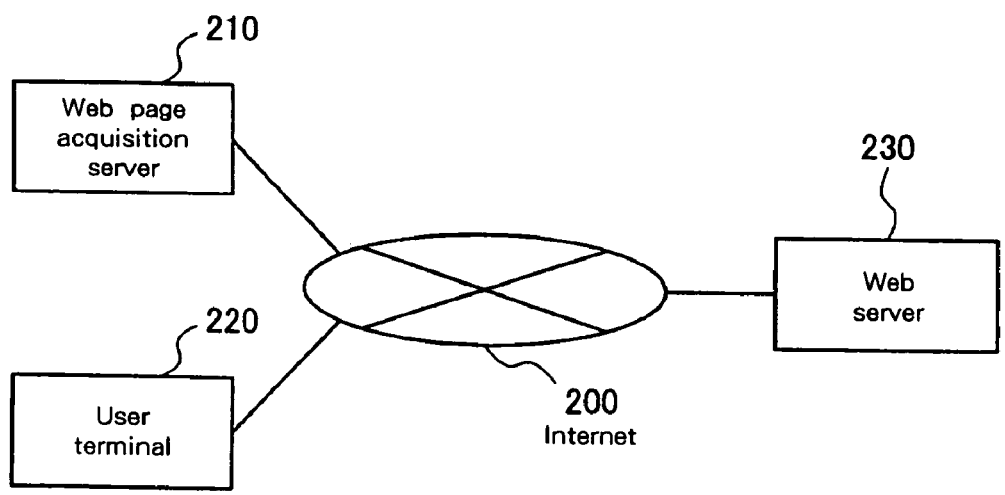
FIG. 2 is a diagram showing the general configuration of a system that carries out the web page acquisition service in accordance with the embodiment.

In FIG. 1, the web page acquisition server 210 shown in FIG. 2 is used as the provider 110. And the user 120 operates the user terminal 220 in order to receive a service provided by the web page acquisition server 210. The web site 130 is included in the web server 230 to provide various web page sources.

An overview of the services provided by this embodiment will now be explained while referring to FIG. 1. The user 120 accesses the provider 110, and transmits to the provider 110 a request, accompanied by a user profile, for the acquisition of a web page from a desired web site 130. It should be noted that the profile of the user 120 must be transmitted to the provider 110 only once, and is not required each time an access is made. Subsequently, based on the request received from the user 120, the provider 110 obtains a web page from the web site 130 and archives it, following which it issues a notification to the user 120 that the web page has been acquired and transmits the web page to the user 120.

Figure 3:
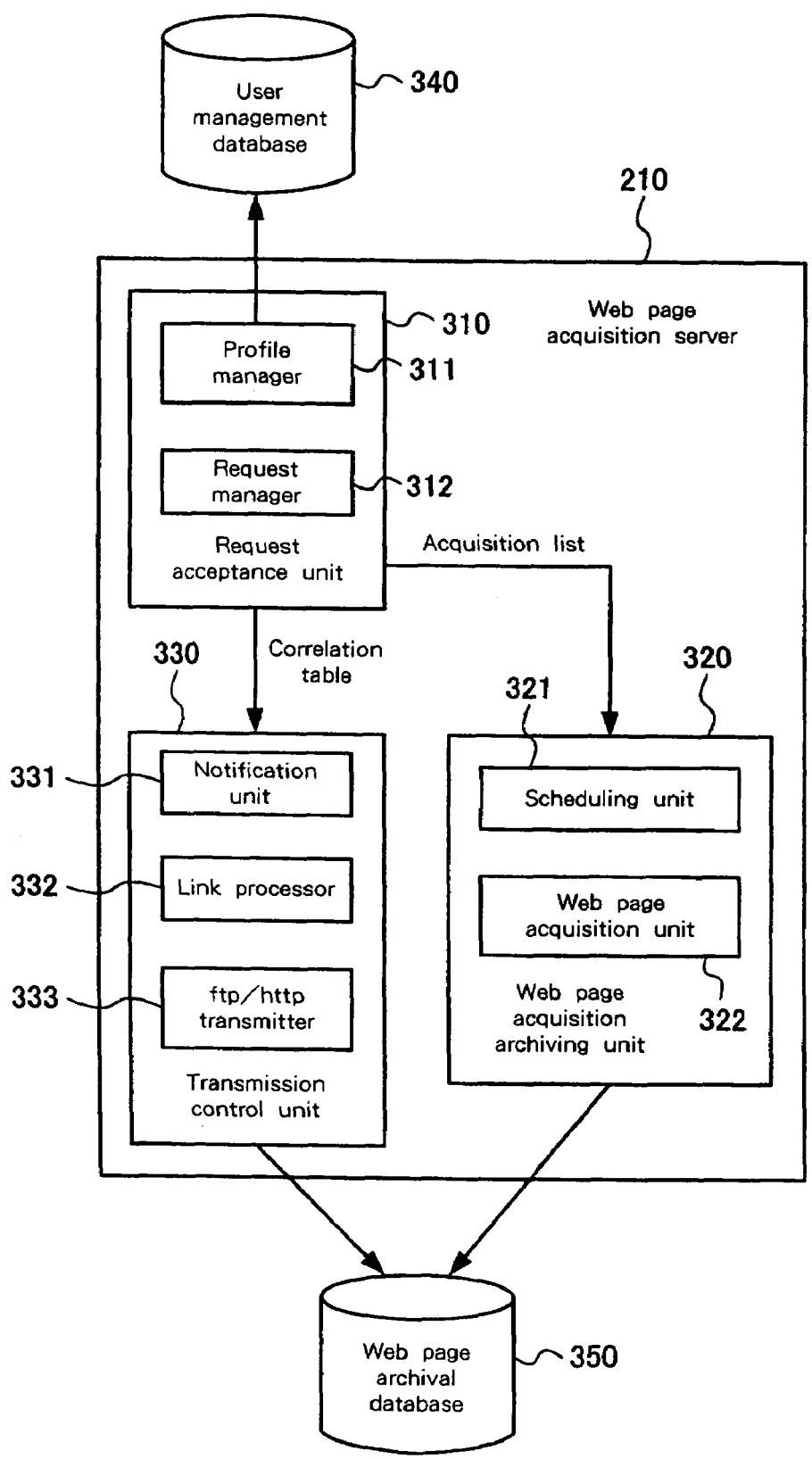
FIG. 3 is a diagram for explaining the arrangement of a web page acquisition server that is established for a provider.

FIG. 3 is a diagram for explaining the configuration of the web page acquisition server 210 that has been incorporated in the provider 110. In FIG. 3, a request acceptance unit 310 accepts and manages a web page acquisition request and a profile issued by the user terminal 220. A web page acquisition/archiving unit 320 obtains a web page from the web server 230 and archives it in accordance with the web page acquisition request submitted by the user terminal 220, which is accepted by the request acceptance unit 310. A transmission control unit 330 controls the transmission to the user terminal 220 of the web page acquired by the web page acquisition/archiving unit 320.

FIG. 4 is a diagram showing an example format for a user profile that the user 120 transmits from the user terminal 220. As is shown in FIG. 4, the user profile includes an Email (Electronic mail) address for issuing a notification to the user 120, the maximum data size that the user terminal 220 can receive at one time (the maximum transmission size), and information as to whether data division and transmission should be performed when the data size exceeds the maximum transmission size. The user profile may also include the URL (Uniform Resource Locator) of a web page for which the pertinent user 120 desires periodical acquisition, and the frequency and the depth employed for the acquisition of the pertinent web page.

If data division and transmission is designated as information included in the user profile, when the size of the data for a desired web page exceeds the maximum transmission size, a request can be issued to the provider 110 to divide the data file into data segments that are equal to or smaller than the maximum transmission size, and to transmit the data segments. When data division and transmission are not designated, however, only that data which corresponds in size to the maximum transmission size will be transmitted.

The data list for a bookmark managed by a web browser can be used as the URL for a web page.

The frequency of the acquisition performed by a web page is the frequency whereat the web page of a designated URL is obtained. In FIG. 4, the web page for which the URL is www.aaa.co.jp is so designated that it will be acquired three times a week, on Monday, Wednesday and Friday, and the web page for which the URL is www.bbb.co.jp/news is so designated that it will be obtained every day. For example, since at the web site 130 whereat news stories are provided the article content is updated every day, daily acquisition of the web page can be designated, while, for the web site 130 whereat data content is not updated so frequently, acquisition of the web page every several days can be designated.

The depth employed for the acquisition of a web page is the distance the web page links must be traced to reach a web page source. For example, at the web site 130, whereat news articles are provided, the headline for each article is entered at the first level on the web page, and the contents of each article are written at the second level. Thus, when one wishes to understand the types of news that are available at the web site 130, the first level is designated the acquisition depth. Whereas when one wishes to obtain article content, the second level is designated the acquisition depth.

FIG. 5 is a diagram showing an example format for a web page acquisition request that is issued by the user 120 while employing the user terminal 220. The web page acquisition request includes a list of the URLs for the web page that is to be obtained, and the time required for the downloading the web page and the acquisition depth. The time limited period for the acquisition of a pertinent web page can also be designated. When the time for the downloading of a web page is designated as information that is to be included in a web page acquisition request, the provider 110 can be notified of the time limit set by the user 120 for the downloading of the pertinent web page. When the time limited period for the acquisition of a web page is designated in addition to the web page downloading time, the time is provided whereat the information contained on the web page that is to be obtained can be designated. For example, when downloading a web page to acquire news at the web site 130 whereat news articles are provided, the news will be old if the web page is obtained too early. Further, a time limit may be set up that depends on the web page content that is to be acquired. Therefore, since a time limited period for the acquisition of the web page is designated, the web page can be obtained at an appropriate time.

The information in FIGS. 4 and 5, which is included in the user profile and in the web page acquisition request, is merely an example. Actually, the format can be so designed that not only can requisite information, such as the URL of a web page and an acquisition depth, be obtained, but also various other information can be acquired in accordance with a service that is provided. Furthermore, when information concerning the user profile, which is user information that is registered in advance, and information included in a web page acquisition request, which is transmitted, as needed, with desired content, are combined and used, a variety of services can be received.

The request acceptance unit 310 accepts the user profile and the web page acquisition request, and manages the information for the user 120. In FIG. 3, the request acceptance unit 310 includes a profile manager 311, for managing a user profile received from the user 120, and a request manager 312, for managing a web page acquisition request. The profile manager 311 stores and manages the accepted user profile in a user management database 340, and for the scheduling process, which will be described later, transmits the user profile, as well as the web page acquisition request, to the web page acquisition/archiving unit 320. Thereafter, for the scheduling process, the request manager 312 transmits the accepted web page acquisition request to the web page acquisition/archiving unit 320.

The web page acquisition/archiving unit 320 includes: a scheduling unit 321, for preparing, for the acquisition of a web page, a schedule based on the user profile and the web page acquisition request that are received from the request acceptance unit 310; and a web page acquisition unit 322, for obtaining a web page from the web server 230 in accordance with the schedule prepared by the scheduling unit 321. Subsequently, a web page source obtained by the web page acquisition unit 322 is stored in a web page archival database 350.

The transmission control unit 330 includes: a notification unit 331 for using E-mail to notify a user 120 that a desired web page has been obtained; a link processor 332, for changing a link for a web page stored in the web page archival database 350; and an ftp/http transmitter 333, for transmitting, to the user 120, a web page for which the link has been changed.

Figure 6:
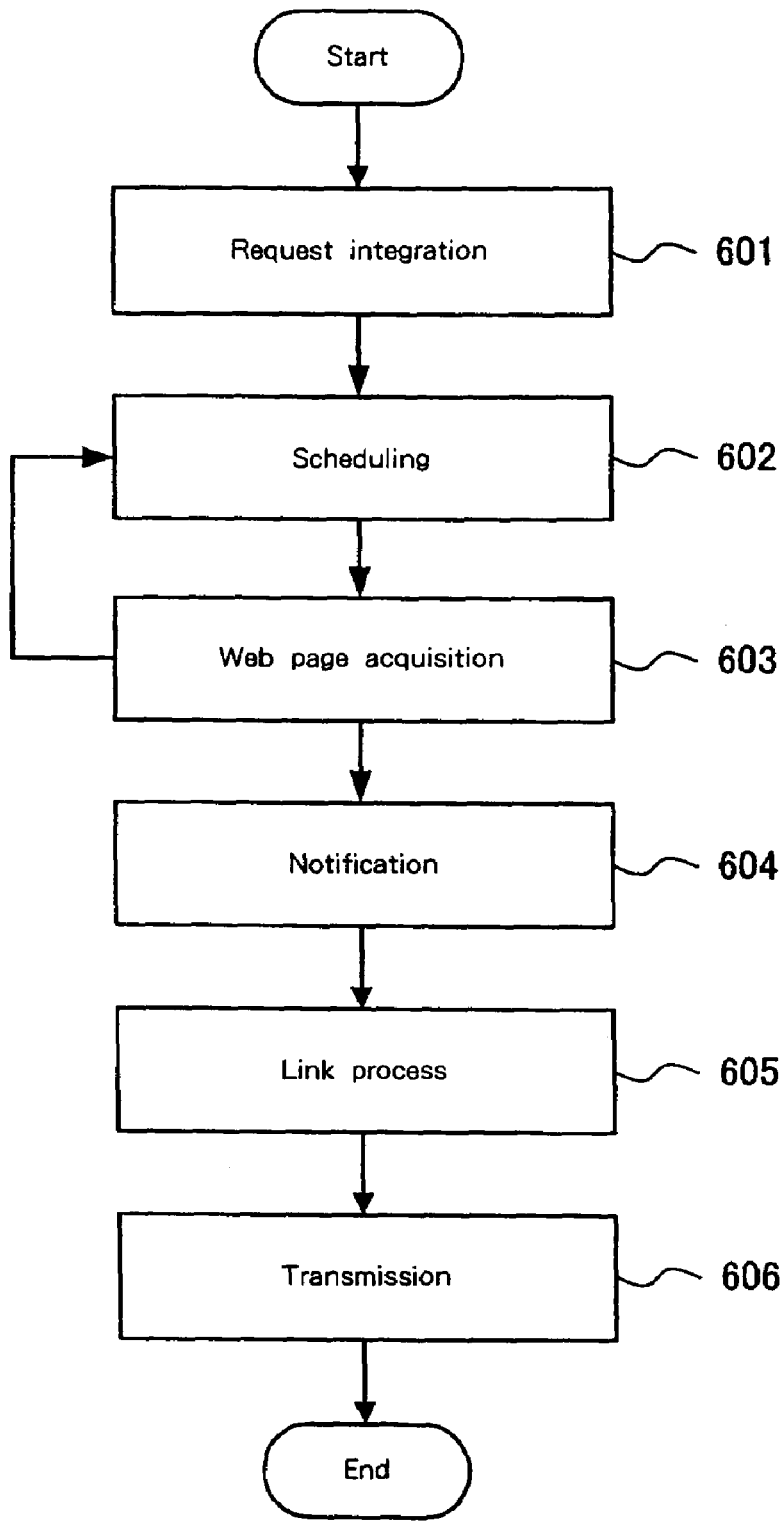
FIG. 6 is a flowchart for explaining the overview of the operation performed by the web page acquisition server of this embodiment.

FIG. 6 is a flowchart for explaining the schematic operation of the web page acquisition server 210 in this embodiment. As the initial condition, the user profile has been transmitted to the provider 110, and is being stored and managed in the user management database 340 by the profile manager 311. A plurality of users 120, who receive the Internet connection service from the provider 110, have accessed the provider 110 using their user terminals 220, and have transmitted their user profiles and web page acquisition requests.

In FIG. 6, first, the request manager 312 of the request acceptance unit 310 receives a web page acquisition request and performs a request integration process, while adding the information for the user profile managed by the profile manager 311 (step 601). During the request integration process, web page acquisition requests received from multiple users 120 are collected, and a list of the web pages that are to be obtained (hereinafter referred to as an acquisition list) is prepared. At this time, overlapping requests are combined to form a single entry, so that an acquisition list wherein there are no overlapping requests can be prepared. The overlapping requests are integrated because when a target web page must be obtained only once for multiple users 120 who have submitted web page acquisition requests, the load imposed on the web page acquisition server 210 can be reduced. Since the web page acquisition requests are input at arbitrary times from the multiple user terminals 220, at a predetermined time a lock is applied to the acceptance of web page acquisition requests, and the request integration process is performed.

Figure 7:
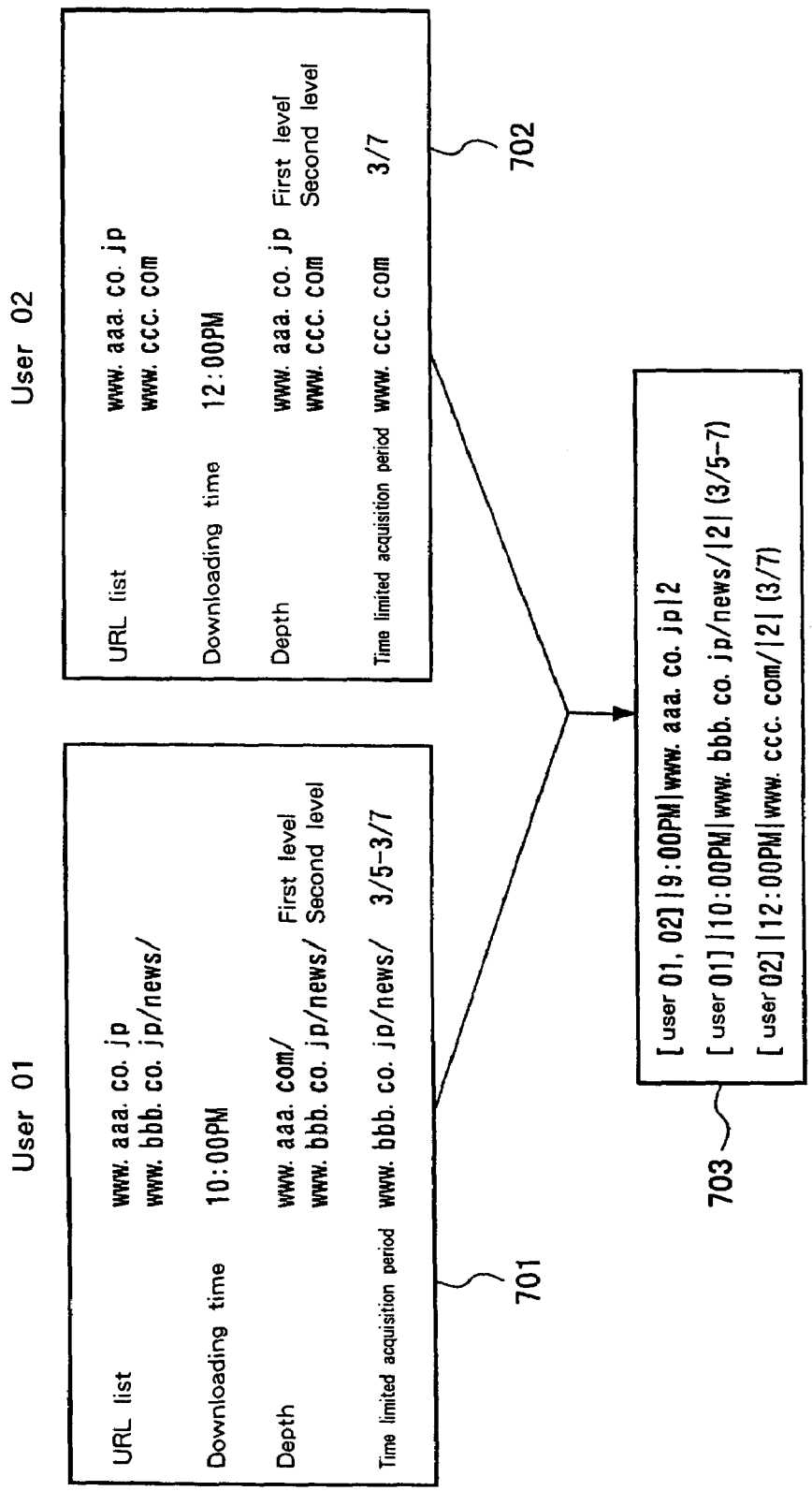
FIG. 7 is a diagram for explaining an example for the integration of two web page acquisition requests and the preparation of an acquisition list wherein no overlapping information is present.

FIG. 7 is a diagram for explaining an example for the integration of two web page acquisition requests and the preparation of an acquisition list having no overlaps. In FIG. 7, for each web page that is to be acquired, the name of a user who has requested the acquisition of a web page, the download time, the URL, the acquisition depth and the time limited period for the acquisition are entered in an acquisition list 703. According to the format shown in FIG. 7, the above data are entered as follows.

[user name]|download time|URL|acquisition depth|time limited acquisition period

In FIG. 7, in a web page acquisition request 701 submitted by a user 120 having the user ID "01" (hereinafter referred to as [user 01]), www.aaa.co.jp and www.bbb.co.jp are the designated web page URLs that are to be obtained. And in a web page acquisition request 702 submitted by a user 120 having a user ID "02" (hereinafter referred to as [user 02]), www.aaa.co.jp and www.ccc.com are designated as the URLs for the web pages that are to be obtained. In other words, in the web page acquisition requests 701 and 702 there are overlapping requests for www.aaa.co.jp. And when the acquisition list 703 is prepared by integrating these requests 701 and 702, the user 01 and the user 02 are written in the user name field for the www.aaa.co.jp record. Since the request submitted for the user 02 is that the acquisition of the web page for www.aaa.co.jp be performed at the second level, while the request for the user 01 is that the acquisition be performed at only the first level, the deeper level, i.e., the second level, is written in the depth field in the list 703. And since a time limited acquisition period is designated for neither user 01 nor user 02, an appropriate time can be selected for the downloading of the web page source. Similarly, information obtained from the web page acquisition request 701 is written in each field of the www.bbb.co.jp record, and information obtained from the web page acquisition request 792 is written in each field of the www.ccc.com record. The request manager 312 of the request acceptance unit 310 employs the acquisition list 703 to prepare a table indicating the correlation of the URL of a web page and the user 120 who requests the web page, and transmits the table to the transmission control unit 330.

Figure 8:
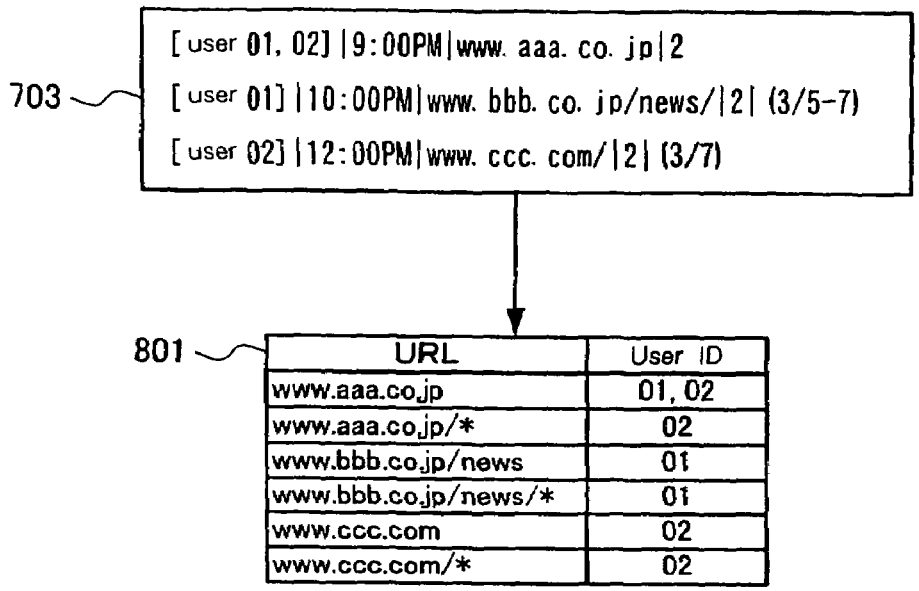
FIG. 8 is a diagram for explaining an example table that is prepared using the acquisition list in FIG. 7.

FIG. 8 is a diagram for explaining the table prepared using the acquisition list 703 in FIG. 7. In FIG. 8, a URL and a corresponding user name are entered in the same record for the acquisition list 703. However, since both users 01 and 02 request the acquisition of www.aaa.co.jp, the users 01 and 02 are entered as user names corresponding to the URL. In FIG. 8, an asterisk "*" following a URL represents a web page that is obtained by tracking the links leading from the web page of the pertinent URL a distance that is equivalent to the number of asterisks. For example, www.aaa.co.jp/* in the second record represents a correlation between the user and a web page obtained by tracking the links, extending from the web page www.aaa.co.jp, a distance that is equivalent to one level.

In FIG. 6, the scheduling unit 321 of the web page acquisition/archiving unit 320 employs the acquisition list 703 to prepare a schedule for the acquisition of a web page (step 602). The schedule is prepared by applying a predetermined scheduling rule for the acquisition list 703. A variety of rules can be employed as scheduling rules, in accordance with the contents of a service provided by a system, but the basic rules that can be set include, for example, 1. the acquisition of a first web page for which an early download time has been set; and
2. the acquisition of a web page to be performed within a time period during which the volume of the communication traffic is small.

Further, a rule according to a special mode, such as a rule according to which, when the web server 230 is not active, an acquisition process is retried a predetermined time later, can be employed with the preceding rules.

Figure 9:
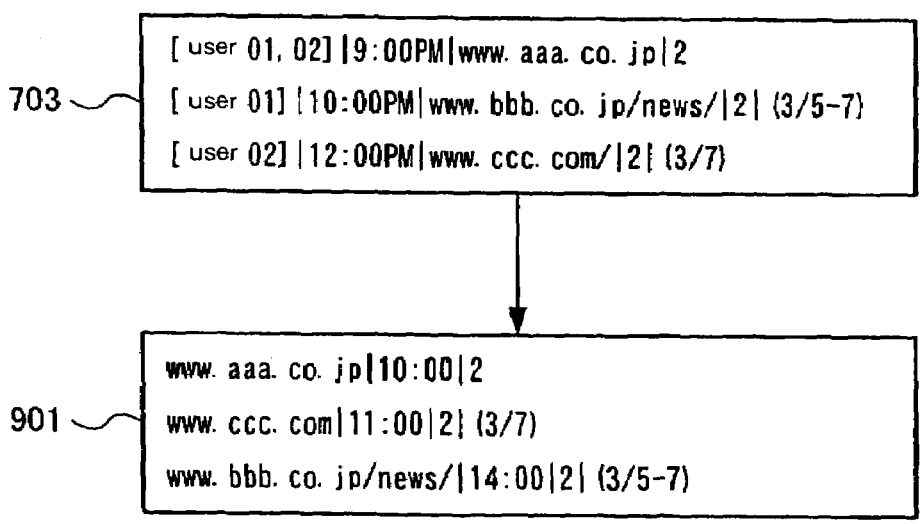
FIG. 9 is a diagram for explaining an example schedule that is prepared using the acquisition list in FIG. 7.

FIG. 9 is a diagram for explaining an example schedule that is prepared using the acquisition list 703 in FIG. 7, and that is based on the scheduling rules 1 and 2. In FIG. 9, for each web page that is to be obtained, the URL of the web page, the time the web server 230 is to be accessed, the acquisition depth, and the time limited acquisition period are entered in a schedule 901. And in accordance with the format in FIG. 9, data are entered as follows.

URL|access time|acquisition depth|time limited acquisition period

According to the schedule 901 in FIG. 9, the web page source for www.aaa.co.jp is to be obtained at ten o'clock in the morning, the web page source for www.ccc.com is to be obtained at eleven o'clock, and the web page source for www.bbb.co.jp is to be obtained at two o'clock in the afternoon. The time limited acquisition period is designated for www.ccc.com and www.bbb.co.jp; the web page source for www.ccc.com should be continued until March 7th, and the web page source of www.bbb.co.jp should be obtained during the period between March 5th and March 7th. In the acquisition list 703, the acquisition of the web page source of www.ccc.com is scheduled first, even though the for www.bbb.co.jp is earlier than the downloading time for www.ccc.com. This is because, since www.ccc.com is present on the web site 130 in the United States, the web page source should be obtained for a time zone during which the network line in the United States is not busy.

In FIG. 6, the web page acquisition unit 322 of the web page acquisition/archiving unit 320 obtains a target web page from the web server 230 in accordance with the schedule 901 prepared by the scheduling unit 321 (step 603). At this time, in order to obtain web pages at two levels or more, each time a link is traced the equivalent of one level, a new URL for a web page at the pertinent linking destination is obtained. Therefore, the schedule 901 must be recurrently prepared by adding a newly acquired URL. In other words, the schedule 901 is dynamically updated whenever a web page is acquired.

Figure 10:
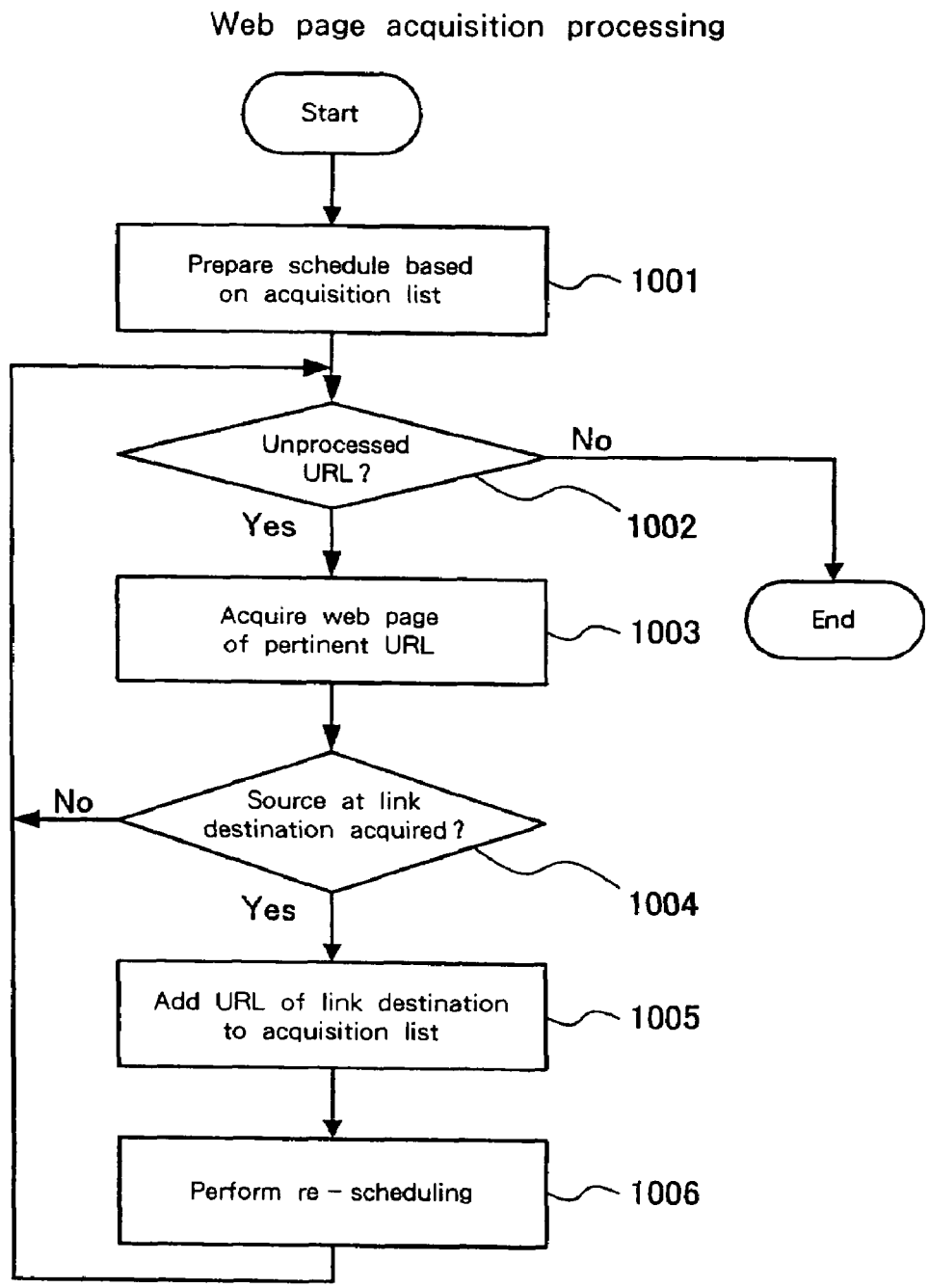
FIG. 10 is a flowchart for explaining the process performed when recurrently preparing a schedule 901 while obtaining a web page.

FIG. 10 is a flowchart for explaining the process for the recurrent preparation of the schedule 901 while a web page is obtained. In FIG. 10, first, based on the acquisition list 703 that is prepared by the request acceptance unit 310, the scheduling unit 321 prepares the schedule 901 to obtain a web page (step 1001). Thereafter, the web page acquisition unit 322 examines the schedule 901 to determine whether there is a remaining unprocessed URL. If an unprocessed URL is present, the web page of the pertinent URL is obtained in accordance with the schedule 901 (steps 1002 and 1003). Then, in the schedule 901, the depth for the acquisition of the pertinent web page is examined to determine whether the source at the linking destination for the web page should be obtained (step 1004). If the source need not be obtained, program control returns to sep 1002. However, if the source must be obtained, the URL at the linking destination is added to the acquisition list 703 (step 1005). Then the schedule 901 is updated, and program control is thereafter returned to step 1002 (step 1006).

When at step 1002, it is determined that all the URLs in the schedule 901 have been obtained, the processing is terminated. The thus obtained web pages are sequentially stored in the web page archival database 350, which is used for the web page archival database 350 that is used to store web pages that are obtained by constructing a virtual tree structure. Using the virtual tree structure, the directory structure of the web server 230 can be reproduced.

Figure 11:
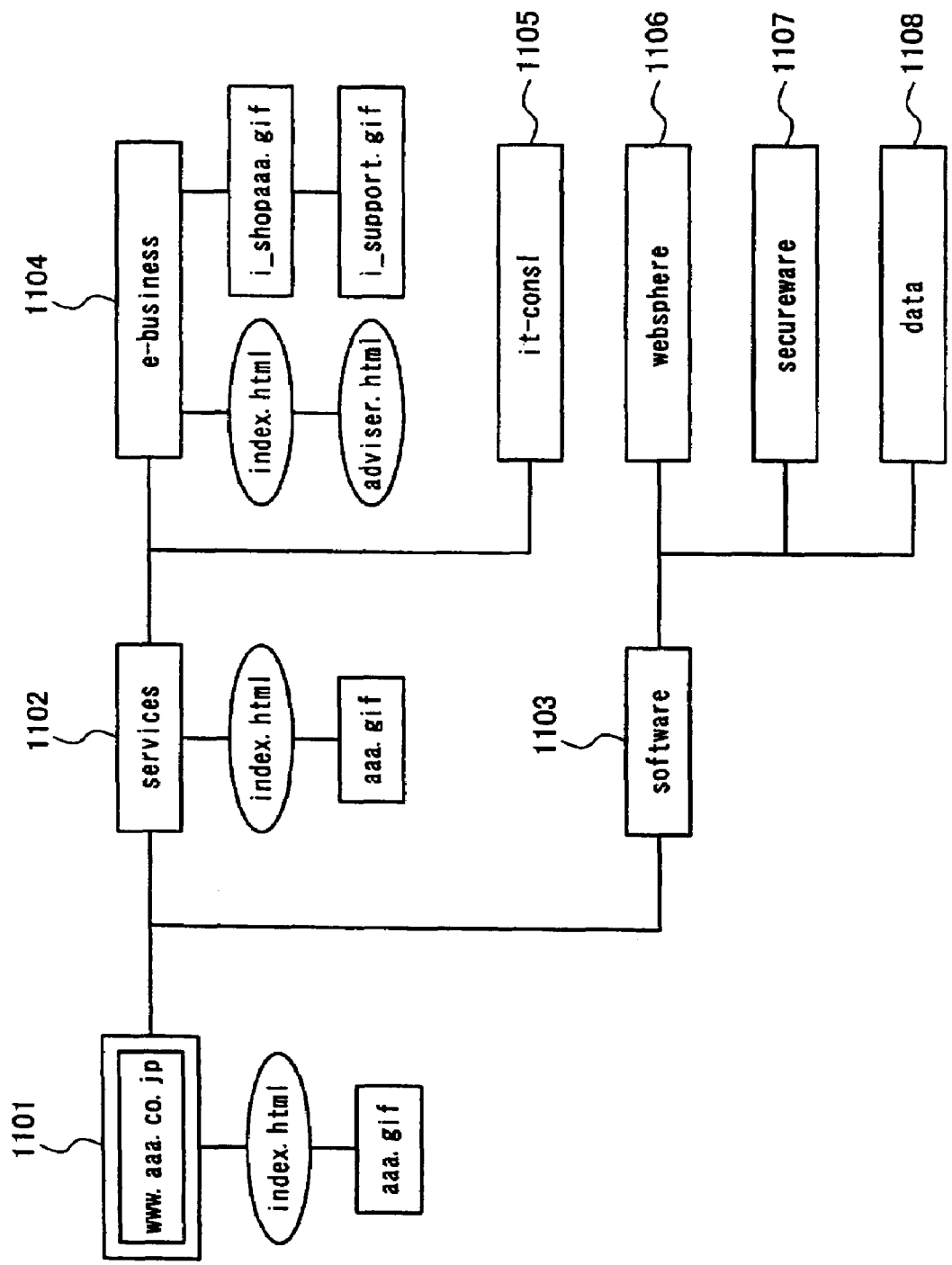
FIG. 11 is a diagram for explaining a virtual tree structure for a web page archival database.

FIG. 11 is a diagram for explaining the virtual tree structure of the web page archival database 350. In FIG. 11, a domain name is entered in a root node 1101, and the names of directories for the web server 230 are entered in child nodes 1102 to 1108. The HTML file and the image file for the individual web pages have the same structure as the file structure for the web server 230, and are stored in corresponding directories.

In the example in FIG. 11, two directories (nodes 1102 and 1103) and one file (index.html) are positioned under www.aaa.co.jp of the root node 1101. And according to the URL form, these entities are represented by www.aaa.co.jp/services/, www.aaa.co.jp/software/ and www.aaa.co.jp/index.html. In addition, two directories (nodes 1104 and 1105) and one file (index.html), which are positioned under the services directory for the node 1102, are represented by www.aaa.co.jp/services/e-business, www.aaa.co.jp/services/it-consl/ and www.aaa.co.jp/services/index.html.

Since according to the file system rule, a domain name such as www.aaa.co.jp, which is used as a URL, is not permitted to be used as a file name, a unique ID that can be used as a file name is provided for the domain name when the web page source is transmitted to the user 120. A pair consisting of an ID and the corresponding domain name is registered in the table. And since there is high probability that the image file names in the web pages may overlap, a unique ID is also provided for the image file name, and the resultant image name is located in a directory that has the image format as its directory name. The paired ID and image file names are also registered in the table.

FIG. 12 is a diagram showing an example table prepared for the tree structure in FIG. 11.

In FIG. 6, when a web page is obtained upon the receipt of a specific web page acquisition request, the notification unit 331 of the transmission control unit 330 transmits an E-mail to the user 120 who issued the web page acquisition request to notify the user 120 that the web page has been acquired (step 604). Thereafter, the user 120 confirms the download time, or the E-mail for the notification of the web page acquisition, and accesses the provider 110 to request that the web page source be downloaded. Then, after the web page acquisition server 210 of the provider 110 has received a download request from the user 120, the profile manager 311 of the request acceptance unit 310 reads the profile of the user 120 from the user management database 340, and transmits to the transmission control unit 330 the profile, along with the download request.

The operation performed by the transmission control unit 330 differs when data division and transmission is designated in the user profile and when it is not designated. Hereinafter, an explanation will be first given for a case wherein data division and transmission are not designated, and second for a case wherein these two operations are designated.

In FIG. 6, the link processor 332 of the transmission control unit 330 reads a pertinent web page source from the web page archival database 350, and performs the link process (step 605). During the link process, the link for the web page is changed from an absolute (dynamic) one, based on the URL, to a relative (local) one in the tree structure for the web page archival database 350. When a pertinent web page source has been transmitted to the user terminal 220, and when the user 120 is to track the link of the web page, if the dynamic link is unchanged, access of the web site 130 would occur across the Internet 200, and as a result, the above linking process is required to maintain the local operation.

The link processor 332 examines the table (see FIG. 8), which is prepared by the request manager 312 of the request acceptance unit 310 and which describes the correlation between the URL of the web page and the user 120 who requested the web page, and determines whether there is another user 120 who has also requested the target web page source for the linking process. If no other user 120 has requested the pertinent web page source, the web page source is deleted from the web page archival database 350, and the record concerning the web page source is deleted from the table.

FIG. 13 is a diagram showing the state of the table 801 in FIG. 8 wherein all the web page sources requested by the user 01 have been downloaded. In FIG. 13, since the web page source for www.aaa.co.jp that has been downloaded by the user 01 is also requested by the user 02, the record for this web page source is not deleted. Accordingly, the web page source is retained in the web page archival database 350, and the user ID for the record is merely changed to "02". As for the www.bbb.co.jp/news and www.bbb.co.jp/news/*, both of which were requested only by the user 01, after the web page sources have been downloaded by the user 01 the pertinent records is deleted from the table 801. Accordingly, the pertinent web page sources are deleted from the web page archival database 350.

If a download request is not issued by the user 120, even after the downloading time has elapsed, various methods can be employed to handle the pertinent web page source. For example, the web page source may continue to be held until another download request is issued by the user 120, or it may be deleted after a predetermined period of time has elapsed or immediately after the download time has elapsed. These methods can be designated by employing the user profile.

Figure 14:
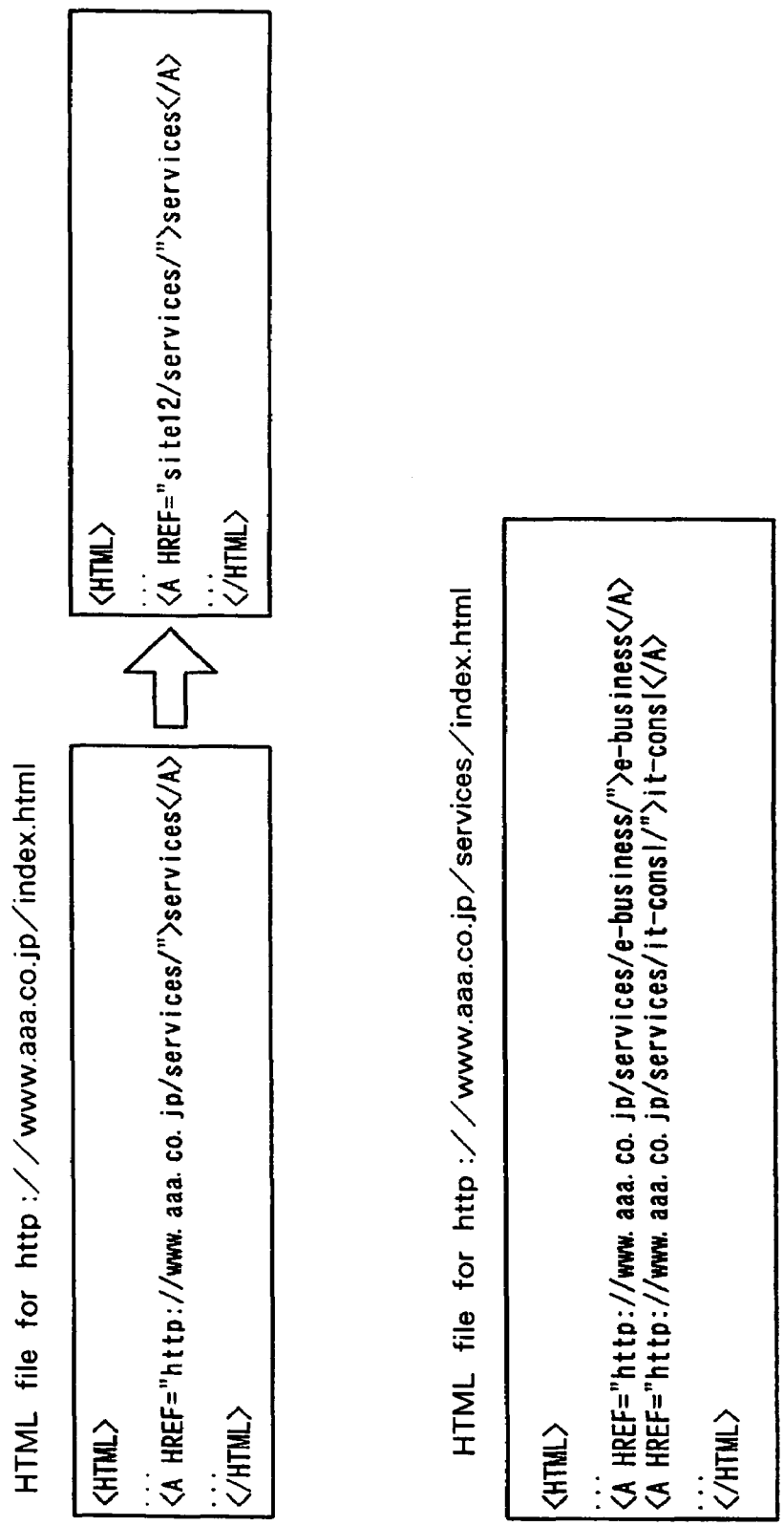
FIG. 14 is a diagram showing the linking processing performed when the downloading up to the second level of the web page for www.aaa.co.jp has been requested.

FIG. 14 is a diagram showing the status of the linking process when downloading up to the second level of the web page for www.aaa.co.jp is requested. In FIG. 14, the web page for www.aaa.co.jp/index.html and web pages for www.aaa.co.jp/services/index.html and www.aaa.co.jp/software/index.html, which are two link destinations written in the web pages, are downloaded. During the linking process, the table in FIG. 12 is examined to change the dynamic link in www.aaa.co.jp/index.html to a local link. And in the example, "http://www.aaa.co.jp/services/" is changed to "site12/services/index.html". On the other hand, the web pages at the link destinations for the web pages www.aaa.co.jp/services/index.html and www.aaa.co.jp/software/index.html, i.e., the web pages in the directories (the nodes 1102 and 1103 in FIG. 11) www.aaa.co/jp/services/ and www.aaa.co.jp/software/, are not downloaded, so that the dynamic link is not changed. In the above example, "http://www.aaa.co.jp/services/e-business/" and "http://www.aaa.co.jp/services/it-consl/" are not changed.

During the linking process, the web page for site12, which corresponds to www.aaa.co.jp., is displayed by using the browser in the user terminal 220 that has downloaded, up to the second level, the web page for www.aaa.co.jp. When the link destinations are called, the web pages downloaded with the web page for site12 are displayed. That is, a local operation is performed. To call a link destination that is further distant from the second level, the user terminal 220 is connected to the Internet 200 to permit the pertinent web site 130 to be accessed.

In FIG. 6, when the linking process has been performed, the ftp/http transmitter 333 of the transmission control unit 330 archives the web page source obtained after the linking process (converts the web page source into a library file), and transmits the resultant web page source to the user 120 (step 606).

Figure 15:
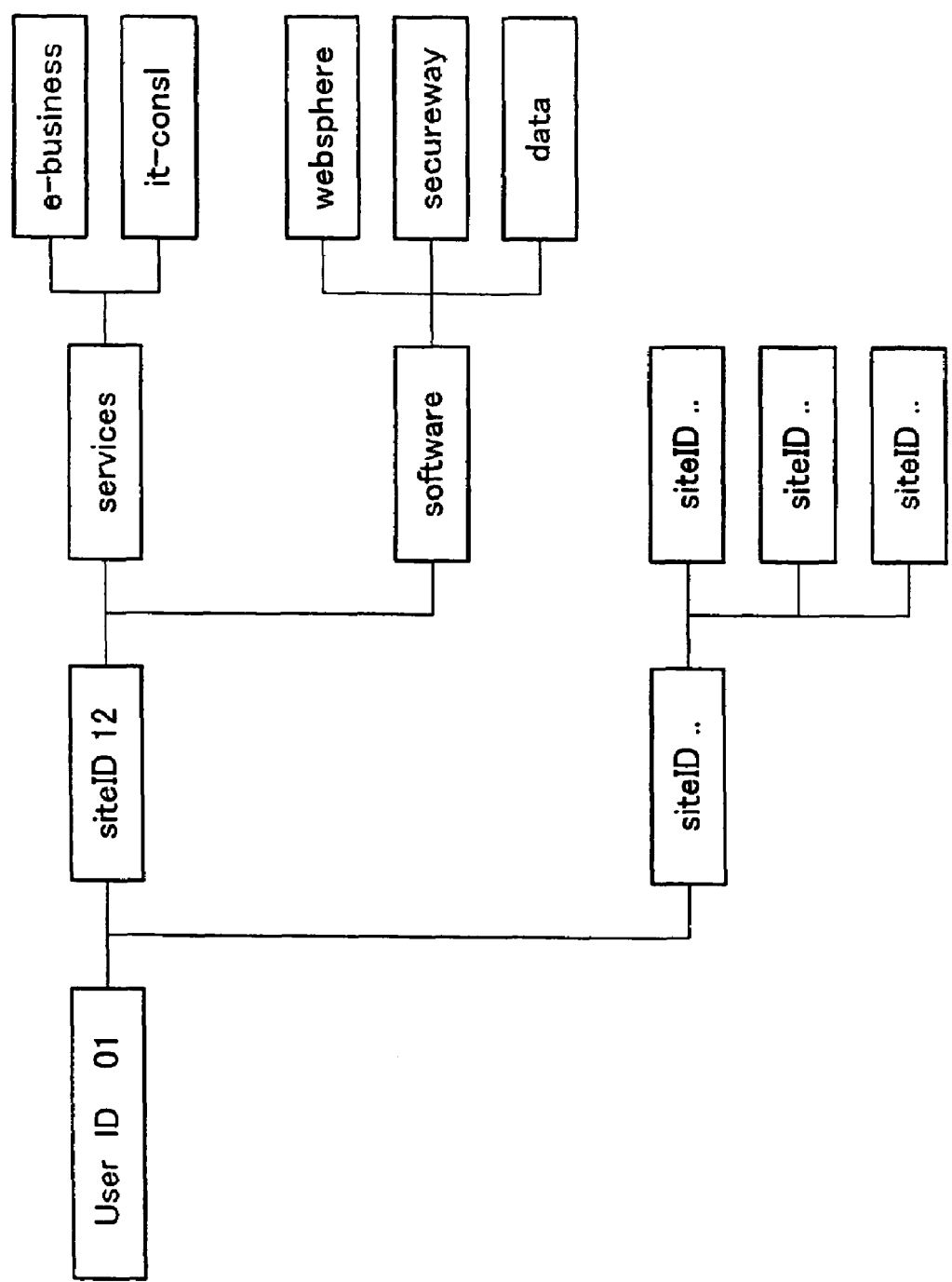
FIG. 15 is a diagram showing the tree structure of the web page sources that are transmitted to the user.

FIG. 15 is a diagram showing the tree structure of a web page source transmitted to the user 120. In FIG. 15, the tree structure is shown for a case wherein the user 120 that has the user ID "01" downloads several web page sources, including site12, which corresponds to www.aaa.co.jp. The web page source for site12 is downloaded up to the third level. And the directory structure used for storing the web page sources in the web page archival database 350 is used unchanged, except that the domain names are replaced by unique IDs. Furthermore, the web page sources to be transmitted to the user 120 includes all the files contained in the directories in the tree structure in FIG. 15. When data division and transmission is designated in the user profile, after the web page source downloading request has been received from the user 120, an examination is performed to determine whether or not data division and transmission is required. And if it is determined data division and transmission are required, they are performed.

Figure 16:
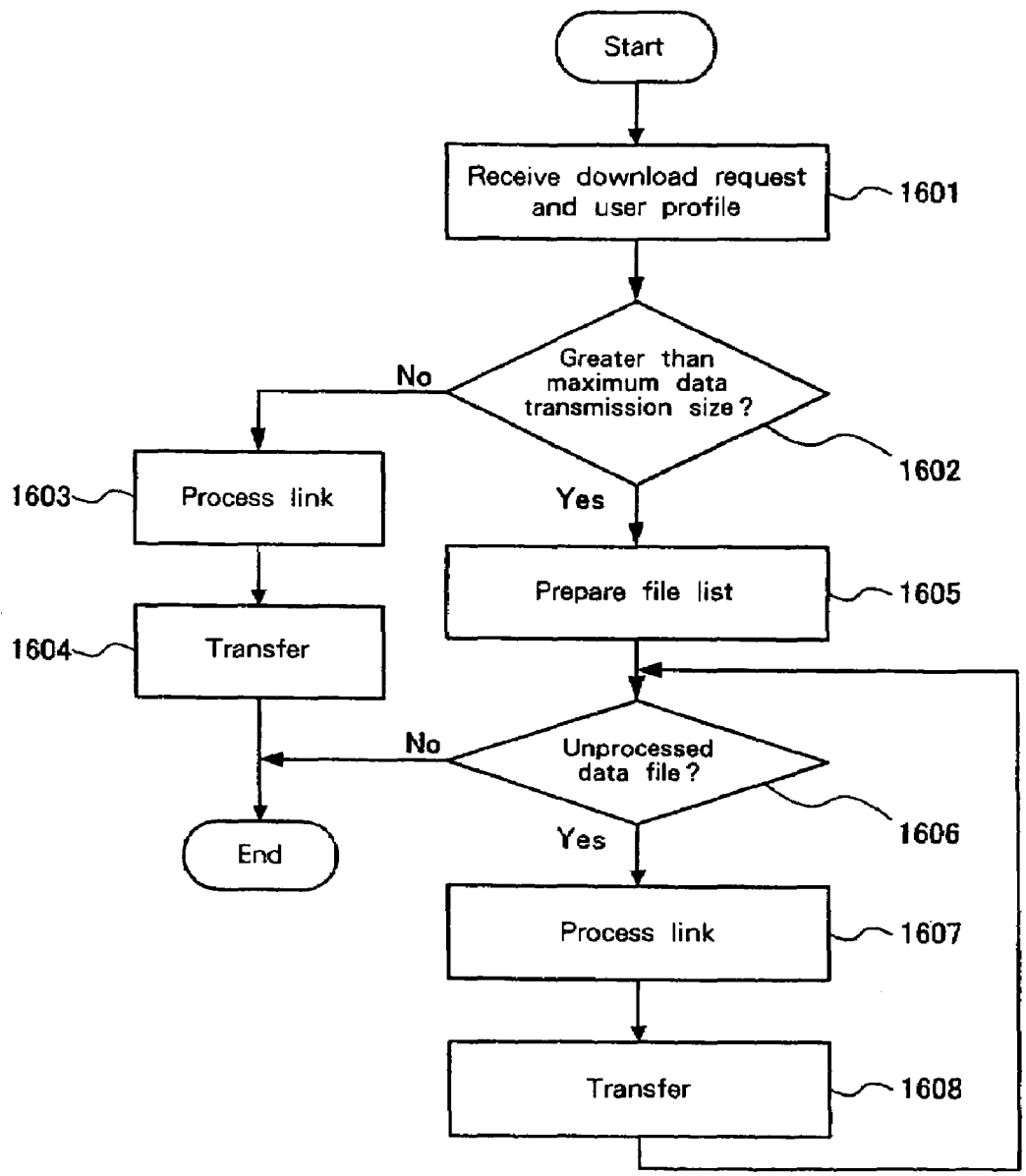
FIG. 16 is a flowchart for explaining the operation performed by a transmission control unit when data division and transmission are designated.

FIG. 16 is a flowchart for explaining the operation performed by the transmission control unit 330 when data division and transmission is designated. In FIG. 16, the transmission control unit 330 receives, from the request acceptance unit 310, the downloading request submitted by the user 120, along with the profile of the user 120 (step 1601). Then, a check is performed to determine whether the size of the data for the web page source that is to be transmitted exceeds the maximum transmission size (step 1602). If the size of the data for the web page source does not exceed the maximum transmission size, as in the operation in FIG. 6, the linking processor 332 changes the links of the web page sources, and the ftp/http transmitter 333 transmits the pertinent web page source to the user 120 (steps 1603 and 1604).

However, if the size of the data for the web page source exceeds the maximum transmission size, the web page source is divided into data files that are not larger than the maximum transmission size for the user terminal 220. At this time, in order not to discontinue the link, the data are divided so as to maintain to the extent possible the connection along the depth. And the list of the obtained data files (file list) is prepared (step 1605). Since the target for the division process is the tree structure of the web page sources in FIG. 15, the obtained data files are parts of the original tree structure. Thereafter, a check is performed to determine whether there is an unprocessed data file in the file list (step 1606). If an unprocessed data file is present, the link processor 332 performs the linking process for the data file (step 1607), and the resultant data file is archived and transmitted to the user 120 (step 1608). The processes at steps 1607 and 1608 are then performed for the unprocessed data file in the file list. And when all the data files have been transmitted to the user 120, the processing is terminated (step 1606). When a plurality of data files have been received by the user terminal 220, they may be maintained unchanged, or they may be assembled and used to form a single file. If a single file is obtained in this fashion, the linking will not be discontinued, even when the file is used as a local file by the user terminal 220.

As is described above, the user 120 can collectively download, from the provider 110, the data files for desired web pages, and an access request need not be transmitted to individual web sites 130 in order to browse the pertinent web pages. Further, at this time, even when downloading a web page source, data are exchanged only between the user terminal 220 and the web page acquisition server 210, and no transmission of data occurs between the web server 230 and the web page acquisition server 210. Thus, there is a considerable reduction in the time the user 120 must wait before being able to browse the web page. The provider 110 accepts in advance a web page acquisition request from the user 120, and to acquire a web page, accesses the web server 230 in a time period during which communication traffic across the network is not heavy. Further, web page acquisition requests issued in common by multiple users 120 can be collectively coped with by the performance of a single access of the web server 230. Therefore, the load imposed on the server of the provider 110 can be reduced considerably.

It is to be understood that the present invention, in accordance with at least one presently preferred embodiment, may be implemented on at least one general-purpose computer running suitable software programs. It may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A web page acquisition service system, said system comprising:
    a web page acquisition server and user terminals connected via a communication network;
    wherein said terminals transmit to said web page acquisition server (a) user profiles comprising contact and transmission size information and (b) web page acquisition requests including acquisition conditions;
    wherein, according to the web page acquisition requests, said web page acquisition server generates an integrated web page acquisition list comprising non-overlapping web page acquisition requests, said integrated web page acquisition list further comprising:
        a user name field;
        a time field;
        a URL field; and
        a depth field;
    wherein, in accordance with said integrated web page acquisition list, said web page acquisition server forms at least one predetermined scheduling rule regarding an acquisition time for at least one web page included in the integrated web page acquisition list and acquires web page sources from a web server on said communication network;
    wherein said web page sources, acquired in accordance with said web page acquisition requests, are formed into library files in accordance with said user profiles and transmitted to said terminals; wherein multiple web page sources for a user terminal are combined into a single library file which is stored in the web page acquisition server and is subsequently transmitted to said user terminal; and wherein, when said web page acquisition server receives from the terminals a plurality of web page acquisition requests for a same web page source, said web page acquisition server obtains and archives, utilizing a single request to a web server according to the integrated web page acquisition list, a corresponding web page source for said plurality of requests such that the same web page source must be requested and obtained only once for the terminals, and transmits said same web page source to the terminals that transmitted the plurality of web page acquisition requests for a same web page source in the form of a library file.

2. The web page acquisition service system according to claim 1, wherein said at least one predetermined scheduling rule takes into account a current amount of communication traffic carried by said communication network.

3. The web page acquisition service system according to claim 1, wherein, according to the at least one predetermined scheduling rule, said web page acquisition server first acquires web page sources for which an early download time has been set within a time period during which communication traffic volume is small.

4. The web page acquisition service according to claim 1, wherein, said at least one predetermined scheduling rule is dynamically updated when a web page source is acquired.

5. A provider embodied in hardware to provide a service for the acquisition of an Internet connection, said provider comprising:

a request acceptance unit for accepting user terminals (a) user profiles comprising contact and transmission size information and (b) web page acquisition requests including web page acquisition conditions, wherein said request acceptance unit generates an integrated web page acquisition list comprising non-overlapping web page acquisition requests, said integrated web page acquisition list further comprising:
a user name field;
a time field;
a URL field; and
a depth field;

a web page acquisition/archiving unit for: forming at least one predetermined scheduling rule regarding an acquisition time for at least one web page included in said integrated web page acquisition list, obtaining web page sources from a web server and archiving said web page sources; and a transmission control unit for, in accordance with said web page acquisition conditions, transmitting said obtained web page sources to the user terminals;

wherein said transmission control unit forms into library files said web page sources, acquired in accordance with said web page acquisition request, in accordance with said user profiles and transmits said library files to said user terminals; wherein multiple web page sources for a user terminal are combined into a single library file which is stored in the web server and is subsequently transmitted to said user terminal;

wherein, when said web page acquisition/archiving unit receives from the user terminals a plurality of web page acquisition requests for a same web page source, said web page acquisition/archiving unit obtains and archives, utilizing a single request to a web server according to the integrated list, a corresponding web page source for said plurality of requests such that the same web page source must be requested and obtained only once for the plurality of users terminals, and transmits said same web page source to said user terminals in the form of a library file.

6. The provider according to claim 5, wherein when a limitation is placed on the size of a data file that a user terminal can receive as a single transmission, said transmission control unit divides into segments having an appropriate size for said user terminal said web page source that is held in said web page acquisition/archiving unit and forms said segments into library files.

7. The provider according to claim 5, wherein said transmission control unit changes a link for said web page source held by said web page acquisition/archiving unit from an absolute link based on a URL of a web page source into a relative link.

8. A web page acquisition method employed by a web page acquisition server provided on a communication network, said method comprising the steps of:

accepting from a plurality of user terminals (a) user profiles including contact and transmission size information and (a) web page acquisition requests including web page acquisition conditions;

generating an integrated web page acquisition list comprising non-overlapping web page acquisition requests from the terminals, the integrated web page acquisition list further comprising:
a user name field;
a time field;
a URL field; and
a depth field;

employing said integrated list to form at least one predetermined scheduling rule regarding an acquisition time for at least one web page included in the integrated web page acquisition list for the acquisition of web page sources;

acquiring across said communication network in accordance with said at least one predetermined scheduling rule said web page sources from a web server and archiving said web page sources; and transmitting said web page sources to said terminals in accordance with said web page a acquisition conditions included in said web page acquisition requests;

wherein said transmitting includes forming said web page sources, acquired in accordance with said web page acquisition requests, into library files in accordance with said user profiles, and transmitting said library files to said terminals; wherein multiple web page sources for a user terminal are combined into a single library file which is stored in the web server and is subsequently transmitted to said user terminal;

wherein, when said web page acquisition server receives from the terminals a plurality of web page acquisition requests for a same web page source, said web page acquisition server obtains and archives, utilizing a single request to a web server and according to the integrated list, a corresponding web page source for said plurality of requests such that the same web page source must be requested and obtained only once for the terminals, and transmits said same web page source to said terminals in the form of a library file.

9. The web page acquisition method according to claim 8, wherein said at least one predetermined scheduling rule takes into account a current amount of communication traffic carried by said communication network.

10. A web page acquisition method, employed by an information terminal device connected to the Internet, comprising the steps of:
receiving web page acquisition requests in which (a) web page acquisition conditions are designated and (b) user profiles comprising contact and transmission size information to said information terminal device;
generating an integrated web page acquisition list comprising non-overlapping web page acquisition requests from a plurality of users, the integrated web page acquisition list further comprising:
a user name field;
a time field;
a URL field; and
a depth field;
issuing web page transmission requests based on at least one predetermined scheduling rule regarding an acquisition time for at least one web page included in the integrated web page acquisition list; and
receiving web page sources in accordance with said at least on predetermined scheduling rule;
wherein said web page sources, acquired in accordance with said web page acquisition request, are formed into library files in accordance with said user profiles and transmitted to said plurality of users; wherein multiple web page sources for at least one of the plurality of users are combined into a single library file which is stored in said information terminal device and is subsequently transmitted to said at least one of the plurality of users;
wherein, when said information terminal device receives from the plurality of users a plurality of web page acquisition requests for a same web page source, said information terminal device obtains and archives, utilizing a single request to a web server and according to the integrated list, a corresponding web page source for said plurality of requests such that the same web page source must be requested and obtained only once for the plurality of users, and transmits said same web page source to said plurality of users in the form of a library file.

11. A storage medium on which computer input means can store a computer-readable program that permits said computer to perform:
a process for accepting, from a plurality of users, (a) user profiles comprising contact and transmission size information and (b) web page acquisition requests including web page acquisition conditions;
a process for generating an integrated web page acquisition list comprising non-overlapping web page acquisition requests from the plurality of users, the integrated web page acquisition list further comprising:
a user name field;
a time field;
a URL field; and
a depth field;
a process for forming at least one predetermined scheduling rule regarding an acquisition time for at least one web page included in the integrated web page acquisition list for the acquisition of web page sources;
a process for acquiring, across said communication network in accordance with said at least one predetermined scheduling rule, said web page sources from a web server, and archiving said web page sources; and
a process for transmitting said web page sources to said users in accordance with said web page acquisition conditions included in said web page acquisition requests;
wherein said process for transmitting includes forming web page sources, acquired in accordance with said web page acquisition request, into library files in accordance with said user profiles and transmitting said library files to said plurality of users; wherein multiple web page sources for at least one of the plurality of users are combined into a single library file which is stored in a server and is subsequently transmitted to said at least one of the plurality of users;
wherein, when a plurality of web page acquisition requests for a same web page source is received from the plurality of users, a single request to a web server is utilized according to the integrated list for obtaining a corresponding web page source for said plurality of requests such that the same web page source must be requested and obtained only once for the plurality of users, and said same web page source is transmitted to said plurality of users in the form of a library file.

12. A program transmission apparatus comprising:
storage means for storing a computer-readable program that permits a computer to perform:
a process for accepting, from a plurality of users, (a) user profiles comprising contact and transmission size information and (b) web page acquisition requests including web page acquisition conditions;
a process for generating an integrated web page acquisition list comprising non-overlapping web page acquisition requests from the plurality of users, said integrated web page acquisition list further comprising:
a user name field;
a time field;
a URL field; and
a depth field;
a process for employing at least one predetermined scheduling rule regarding an acquisition time for at least one web page included in the integrated web page acquisition list for the acquisition of web page sources,
a process for acquiring, across said communication network in accordance with said at least one predetermined scheduling rule, said web page sources from a web server, and archiving said web page sources, and
a process for transmitting said web page sources to said users in accordance with said web page acquisition conditions included in said web page acquisition requests;
wherein said process for transmitting includes forming said web page sources, acquired in accordance with said web page acquisition request, into a library files in accordance with said users profiles, and transmitting said library files to said plurality of users; wherein multiple web page sources for at least one of the plurality of users are combined into a single library file which is stored in the storage device and is subsequently transmitted to said at least one of the plurality of users; and
transmission means for reading said program from said storage means and for transmitting said program;
wherein, when a plurality of web page acquisition requests for a same web page source is received from the plurality of users, a single request to a web server is utilized according to the integrated list for obtaining a corresponding web page source for said plurality of requests such that the same web page source must be requested and obtained only once for the plurality of users, and said same web page source is transmitted to said plurality of users in the form of a library file.

13. A program storage device readable by machine, embodying a program of instructions executable by the machine to perform a method for web page acquisition, said method comprising the steps of:

transmitting, to a provider, (a) user profiles comprising contact and transmission size information and (b) web page acquisition requests in which web page acquisition conditions are designated;

generating an integrated web page acquisition list comprising non-overlapping web page acquisition requests from a plurality of users, said integrated web page acquisition list further comprising:
- a user name field;
- a time field;
- a URL field; and
- a depth field;

issuing web page transmission requests to a web server based on a at least one predetermined scheduling rule regarding an acquisition time for at least one web page included in said integrated web page acquisition list; and receiving web page sources that, in accordance with said web page transmission requests, are transmitted to the plurality of users;

wherein said web page sources, acquired in accordance with said web page acquisition requests, are formed into library files that, in accordance with said user profiles, are transmitted to the plurality of users; wherein multiple web page sources for as least one of the plurality of users are formed into a single library file which is stored in a server and is subsequently transmitted to said at least one of the plurality of users;

wherein, when a plurality of web page acquisition requests for a same web page source is received front the plurality of users, a single request to a web server is utilized according to the integrated list for obtaining a corresponding web page source for said plurality of requests such that the same web page source must be requested and obtained only once for the plurality of users, and said same web page source is transmitted to said plurality of users in the form of a library file.

\* \* \* \* \*